No. 788,443. Patented April 25, 1905.

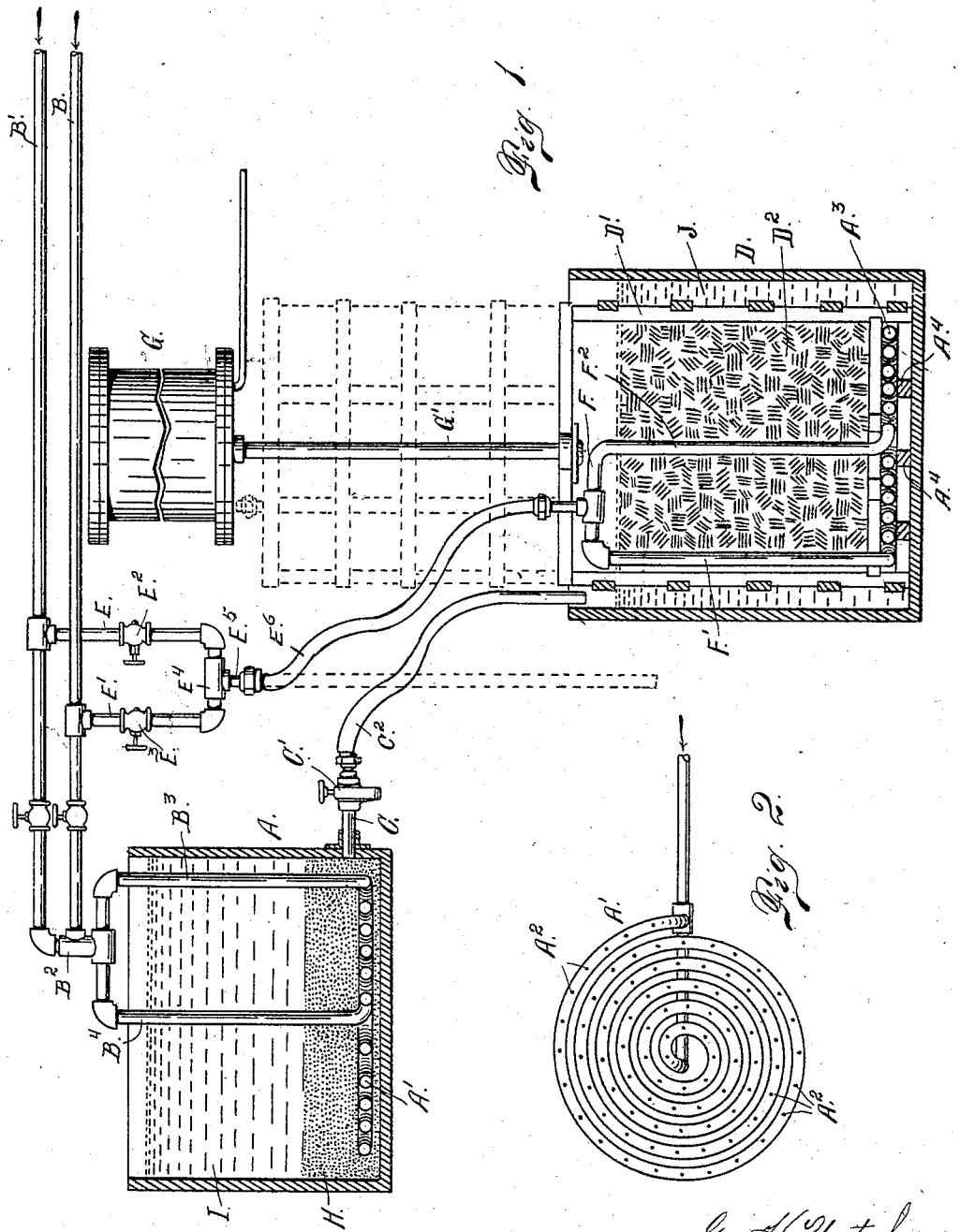

UNITED STATES PATENT OFFICE.

GEORGE H. WATERBURY, OF DENVER, COLORADO, ASSIGNOR TO THE WATERBURY METALS EXTRACTION COMPANY, OF SPOKANE, WASHINGTON.

PRECIPITATION PROCESS.

SPECIFICATION forming part of Letters Patent No. 788,443, dated April 25, 1905.

Application filed June 30, 1904. Serial No. 214,749.

*To all whom it may concern:*

Be it known that I, GEORGE H. WATERBURY, a citizen of the United States, residing in the city and county of Denver and State of Colorado, have invented certain new and useful Improvements in Precipitation Processes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improved process for the extraction of copper from ores.

In carrying out my improved process I employ two steps—namely, first, the leaching step, and, second, the precipitating step. The leaching step consists in dissolving the copper or placing it in solution, while the precipitating step consists in settling the dissolved copper. This application is limited, so far as the claims are concerned, to the precipitating step, or, in other words, this application covers a process of precipitating the dissolved copper regardless of the means employed in placing the copper in solution.

A portion of my present application is as set forth in an application filed by me April 18, 1904, Serial No. 203,747, said application being entitled "A process for the extraction of copper from ores." The complete process of extracting the copper as set forth in the aforesaid application will now be described; but the claims will be limited to the process of precipitation, as aforesaid.

The complete process as I prefer to practice it is as follows: The ore is first prepared by pulverizing it to a suitable mesh. This pulverized ore is placed in a tank containing a solution of sulfurous acid, to which is added a comparatively small quantity of sulfuric acid. The water should be saturated with the sulfurous acid, which is comparatively cheap. But a small quantity of the sulfuric or more expensive acid is required. After the ore is placed in this solution air and steam are introduced at the bottom of the tank through the instrumentality of suitable apparatus, whereby the combined fluid is forced up through the ore, with the result that the copper is extracted or dissolved. This extraction of the copper requires from twenty to sixty minutes approximately, depending on the nature of the ore and other conditions. The union of the steam with the air heats the volume of air in a much more satisfactory and economical way than can be accomplished in any other manner. It is evident that the instant the steam and air enter the tank the air will immediately expand and pass rapidly upwardly through the ore in the tank. This action of the air produces the necessary agitation whereby the particles of ore are brought into direct and immediate contact with the acid whereby the extraction or dissolving of the copper is effected. As soon as the leaching operation is complete the solution is drawn off into a precipitating-tank containing particles of metal, as aluminium or steel. This metal may be placed in a precipitating-tank in any desired form, as in sheets or smaller particles. The form must, however, be such that the solution is allowed to circulate freely therethrough. Air and steam are then introduced at the bottom of the precipitating-tank and caused to pass up through the copper solution, whereby the copper is precipitated or caused to settle on the bottom of the tank.

In the carrying out of the improved process I employ suitable apparatus which will now be described, though it must be understood that I do not limit the invention to the said apparatus shown; neither is there anything claimed in this application on the said apparatus.

Referring to the accompanying drawings, Figure 1 is a view of an apparatus for carrying out the process, the two tanks—namely, the leaching-tank and the precipitating-tank—being shown in central vertical section. Fig. 2 is an underneath view of the pipe-coil located in the bottom of either tank, showing the perforations through which the air and steam pass into the solution.

The same reference characters indicate the same parts in both views.

Let A designate the leaching-tank, in the bottom of which is placed a pipe-coil A', perforated on its under side, as shown at $A^2$. (See Fig. 2.) Air from a pipe B and steam from a pipe B' are introduced into the tank in any suitable manner. As shown in the drawings, these two pipes unite at $B^2$, where the air and steam join. The air and steam then pass through two pipes $B^3$ and $B^4$, the said pipes being respectively connected with the opposite extremities of the perforated coil A', whereby the air and steam are introduced into the bottom of the tank. The solution from the tank A passes therefrom to a valved outlet C, controlled by a valve C', to a conduit $C^2$, and thence into the precipitating-tank D, having a cage D' containing metal $D^2$ in a sufficiently-divided form to enable the solution to circulate freely therethrough. Connected with the air and steam pipes B and B' are branches E and E', provided with valves $E^2$ and $E^3$. The air and steam from these pipes unite at $E^4$ and pass through a suitable outlet $E^5$ into a conduit $E^6$, which connects at its lower extremity with a pipe F, having two downwardly-extending branches F' and $F^2$, whose lower extremities are connected with the opposite extremities of the perforated coil $A^3$, which is substantially of the construction shown in Fig. 2, the perforations of the coil being preferably located on the under side. The coil $A^3$ is preferably supported by means of slats $A^4$, placed on the bottom of the tank D, whereby the coil is sufficiently supported from the bottom of the tank to enable the air and steam to escape freely therefrom and pass upwardly through the metal. If desired, steam alone may be introduced into the precipitating-tank.

In the drawings a hydraulic cylinder G may be employed for lifting the cage D' out of the precipitating-tank or to the position shown by dotted lines in Fig. 1. A piston (not shown) located within the hydraulic cylinder is connected, by means of a rod G', with the said cage, whereby the latter may be lifted and the metal or contents of the cage raised out of the precipitating-tank at pleasure.

In the leaching-tank, H designates the ore, and I the solution of the tank, while in the precipitating-tank, J designates the solution.

I prefer to use aluminium and steel as the metal in the precipitating-tank, as better results are obtained from the use of this particular metal.

Having thus described my invention, what I claim is—

1. The herein-described process of precipitating copper in solution, consisting in placing the solution in a tank or receptacle containing pieces of aluminium of a shape to allow the solution to pass readily therethrough, and introducing air and steam simultaneously for agitating purposes.

2. The herein-described process of precipitating copper in solution, consisting in placing the solution in a tank or receptacle containing pieces of aluminium and steel of a shape to allow the solution to pass readily therethrough, and introducing fluid for agitating purposes.

In testimony whereof I affix my signature in presence of two witnesses.

GEORGE H. WATERBURY.

Witnesses:
DENA NELSON,
J. T. NELSON.